United States Patent [19]

Shiraishi

[11] Patent Number: 4,519,466
[45] Date of Patent: May 28, 1985

[54] OMNIDIRECTIONAL DRIVE SYSTEM

[75] Inventor: Yoshiro Shiraishi, Tokyo, Japan

[73] Assignee: Eiko Shiraishi, Los Angeles, Calif.

[21] Appl. No.: 363,615

[22] Filed: Mar. 30, 1982

[51] Int. Cl.³ .............................................. B62D 57/00
[52] U.S. Cl. ..................................... 180/7.1; 180/252; 180/253
[58] Field of Search ................. 180/7.1, 252, 253, 257

[56] References Cited

U.S. PATENT DOCUMENTS

| | | | |
|---|---|---|---|
| 3,212,594 | 10/1965 | Scott | 180/7 R |
| 3,424,259 | 1/1969 | Aghnides | 180/7 R |
| 3,655,005 | 4/1972 | Chicurel | 180/7 R |
| 3,876,026 | 4/1975 | Pronasko | 180/252 |
| 3,972,379 | 8/1976 | Norris | 180/253 |
| 4,261,589 | 4/1981 | Wilkes | 180/7.1 |
| 4,411,329 | 10/1983 | Stedman | 180/257 |

FOREIGN PATENT DOCUMENTS 973586  3/1960  Fed. Rep. of Germany ..... 180/7 R

Primary Examiner—Joseph F. Peters, Jr.
Assistant Examiner—Kenneth R. Rice
Attorney, Agent, or Firm—Koda and Androlia

[57] ABSTRACT

An omnidirectional drive system including a driven body, a drive unit having an inclined doughnut-shaped drive wheel and a follower unit. The driven body is supportable either jointly by the drive and follower units or solely by the follower unit. The driven body can move omnidirectionally through 360 degrees and its direction of movement can be determined by an angle at which the drive wheel is tilted relative to the driven body.

4 Claims, 21 Drawing Figures 4,519,466

OMNIDIRECTIONAL DRIVE SYSTEM

BACKGROUND OF THE INVENTION

1. Field of the Invention

The present invention relates to an omnidirectional drive system for transferring an object in any desired direction and more particularly to a drive system capable of simulating the ambulatory patterns of a human being which include walking back and forth, laterally or crabwise, and obliquely along a rectilinear or curved path.

2. Prior Art

Presently available land vehicles for use in everyday or industrial transportation rely almost entirely on the concept of "wheels" since it has been known for a long time that wheels are useful in reducing the resistance to movement. The use of such wheels for transportation purposes has been so prevalent that no user finds wheeled vehicles inconvenient, and our society depends fully on wheeled vehicles. However, conventional wheeled vehicles present certain disadvantages in that their movement and type of movement is restricted. In addition, conventional land vehicles have another disadvantage in that they cannot simulate the walking patterns of a human being and it would be useful in some situations that the vehicle simulate such walking patterns.

Generally, human ambulatory motion is considered to consist generally of three patterns. The first pattern is to move in the direction in which the human being faces, as during normal walking. The second pattern is characterized by rotation about the vertical axis of the human being as the human being walks or stays at rest. The third pattern permits a human being to selectively move in any desired direction while he faces in any fixed direction. These patterns of motion cannot be achieved by conventional wheeled vehicles.

SUMMARY OF THE INVENTION

It is a general object of the present invention to provide a drive system capable of omnidirectional movement.

It is another object of the present invention to provide a drive system capable of simulating the ambulatory movement of a human being.

It is another object of the present invention to provide a drive system which includes, in combination, an omnidirectional drive unit and a follower unit driveable by the drive unit.

It is still another object of the present invention to provide a drive system including a drive unit and a follower unit, wherein the drive unit is subjected to greater resistance to rolling movements thereof on a floor or other surface than that of the follower unit so the follower unit will fully follow the reactive forces produced when the drive unit moves.

It is still another object of the present invention to provide a drive system including a partially spherical or similar surface rotatable at an inclined position to produce reactive forces in a directional normal to the surface which is utilized as the driving power.

It is yet another object of the present invention to provide a practical omnidirectional drive system that is capable of moving directly along a rectilinear path in any desired direction through 360 degrees while the drive system is travelling or at rest as it faces in a fixed direction.

BRIEF DESCRIPTION OF THE DRAWINGS

The above-mentioned features and objects of the present invention will become more apparent from the following description taken in conjunction with the accompanying drawings wherein like reference numerals denote like elements and in which.

DETAILED DESCRIPTION OF THE INVENTION

Figure 1:
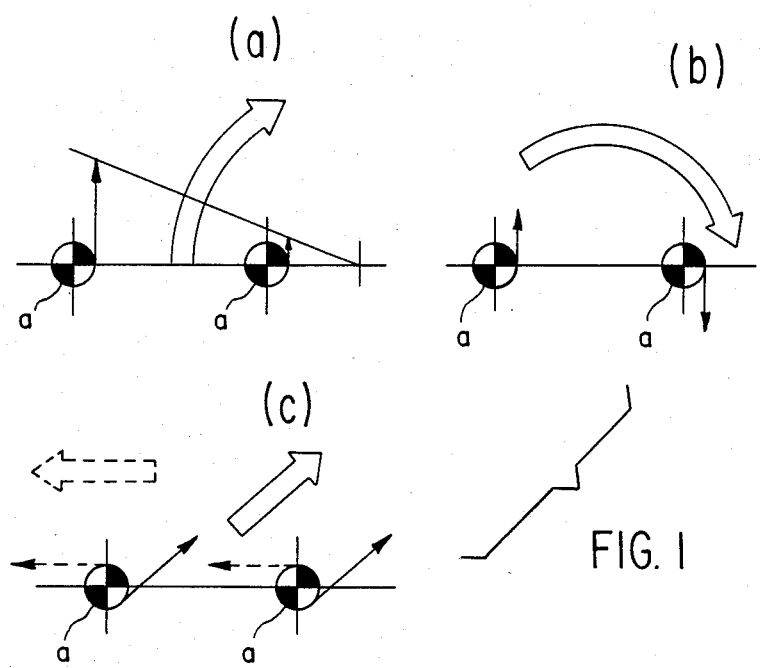
FIG. 1 is an operational diagram showing the direction of movement of an omnidirectional drive system in accordance with the teachings of the present invention.
Figure 2:
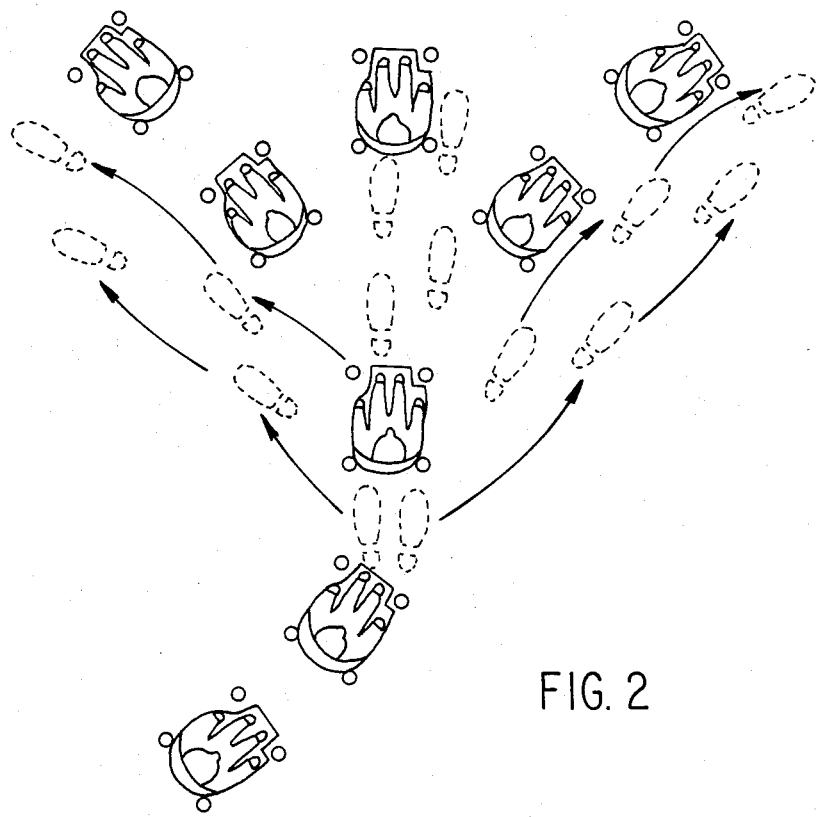
FIG. 2 is an operational diagram illustrating the drive system of the present invention as it changes direction of movement while travelling in a manner similar to ambulatory movement of a human being.
Figure 3:
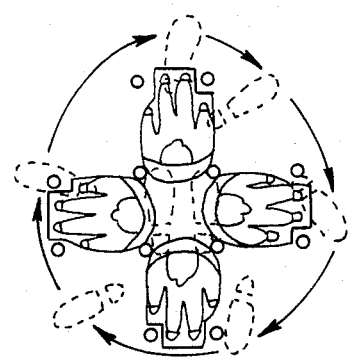
FIG. 3 is an operational diagram showing the drive system of the present invention as it rotates through 360 degrees while staying in one place.
Figure 4:
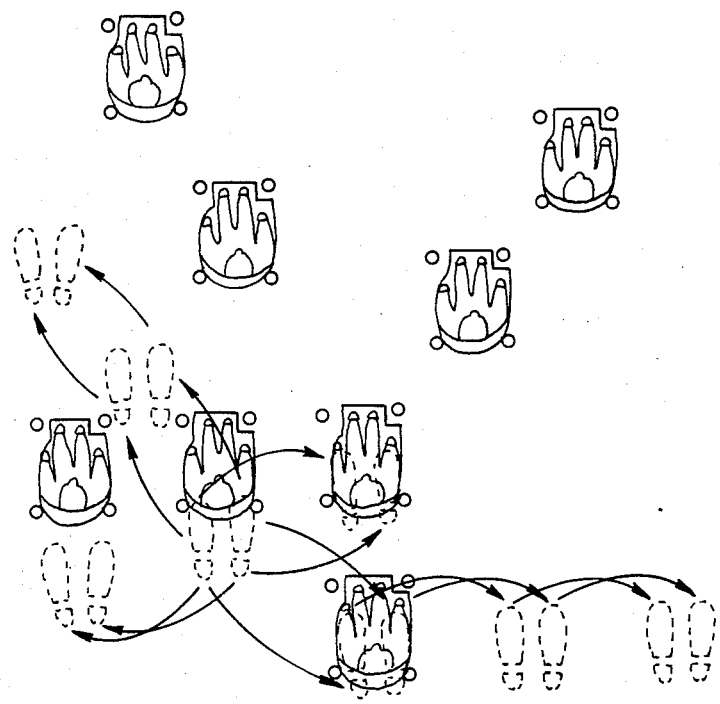
FIG. 4 is an operational diagram showing the drive system as it moves in any desired direction while facing in one direction.

The drive system, in accordance with the teachings of the present invention, has a drive unit including a pair of rolls a and a which are rotatable in the direction of the thin arrows shown in FIG. 1 at (a), (b) and (c) to cause the drive units to move angularly in the directions of the thick arrows. When the drive unit is thus angularly moved, the drive system enables a vehicle in which the drive system of the present invention is incorporated to move around as shown in FIGS. 2 through 4.

Figure 6:
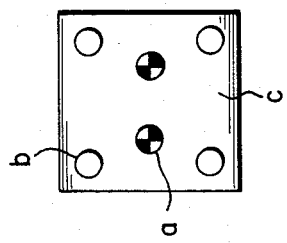
FIG. 6 is a plane view of the driven body shown in FIG. 5.
Figure 5:
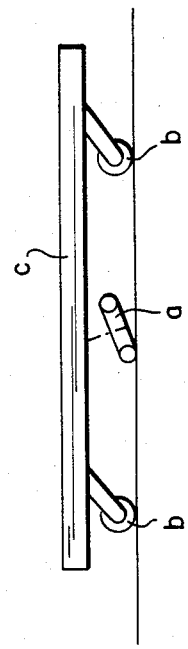
FIG. 5 is a diagrammatic elevational view of a driven body supported by follower units while the driven body is moving.
Figure 8:
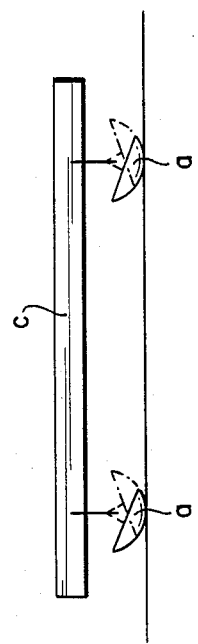
FIG. 8 is a diagrammatic elevational view of a driven body in accordance with the teachings of the present invention which is supported and driven by drive units as shown in FIG. 7.
Figure 7:
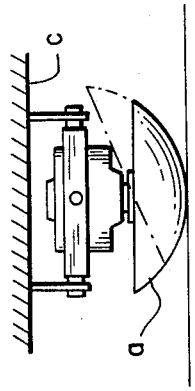
FIG. 7 is a diagrammatic elevational view of a drive unit of the present invention incorporating a partially spherical body.
Figure 9:
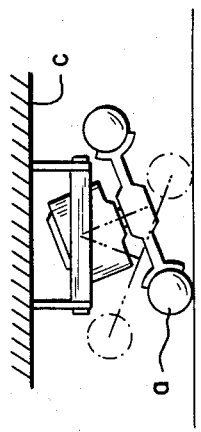
FIG. 9 is a plan view of a driven body of the present invention with drive and follower units.
Figure 12:
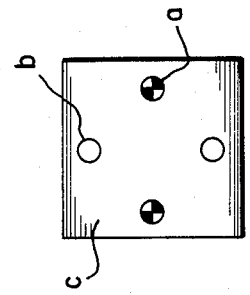
FIG. 12 is a view similar to FIG. 9 showing a driven body utilizing another embodiment for the arrangement of drive and follower units.
Figure 10:
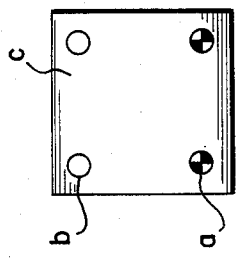
FIG. 10 is a diagrammatic elevational view of a drive unit of the present invention utilizing spherical surfaces.
Figure 11:
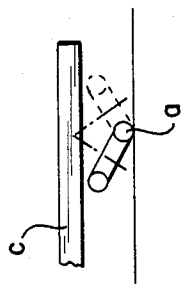
FIG. 11 is a diagrammatic elevational view of a driven body which is supported and driven by the drive unit illustrated in FIG. 10.

The drive unit in the drive system of the present invention is available in two types. According to one type, a drive unit body c is supported by all of the follower units b and is driveable by the drive unit a, as is shown in FIGS. 5 and 6. FIGS. 7, 8, 9, 10, 11 and 12 show another type in which the driven units a support and drive the driven unit body c. A choice is available between these two types of drive units to meet the requirements of a particular user. The drive unit may utilize a partially spherical surface as shown in FIG. 7 or a similar surface as shown in FIG. 10.

The follower unit b may include an ordinary or special castor in the form of a roller which can freely change its direction of movement by following the drive unit a. The type and number of follower units used are selected in view of the structure and weight of an object to be transported and the arrangement of the drive units associated with the follower units.

The drive unit shown in FIG. 10 is designed so as to be driven by an electric motor and is suitable for use with a handling cart as is illustrated in FIGS. 2 to 4 and 13 to 21. The motor-driven drive unit a of FIG. 10 will be described below in more detail with reference to FIGS. 13 through 21.

Figure 13:
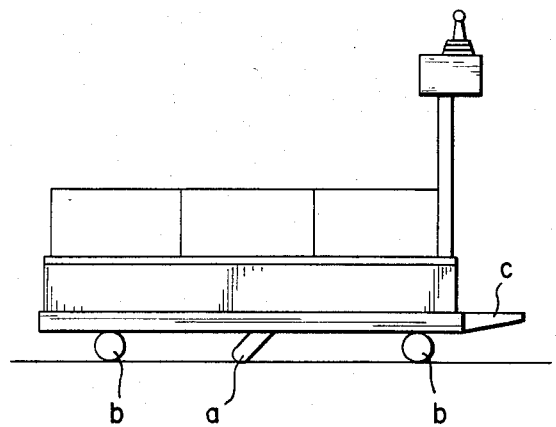
FIG. 13 is a side view of a handling cart in accordance with the teachings of the present invention.
Figure 14:
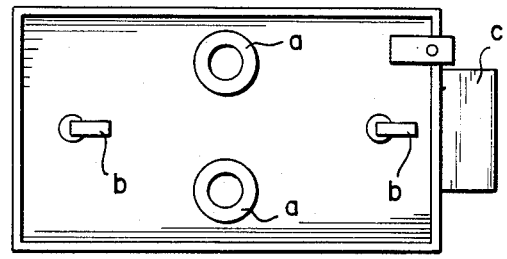
FIG. 14 is a plan view of the handling cart illustrated in FIG. 13.
Figure 19:
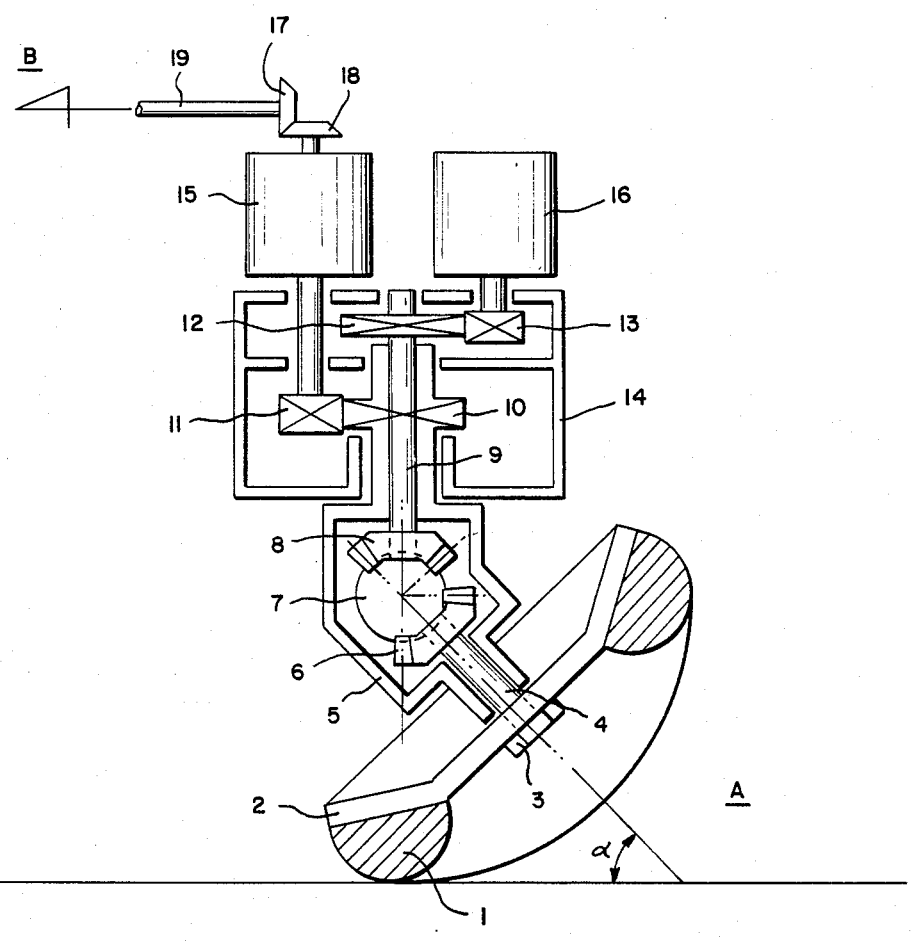
FIG. 19 is a side elevational view partially in cross section of the drive unit in accordance with the teachings of the present invention.
Figure 15:
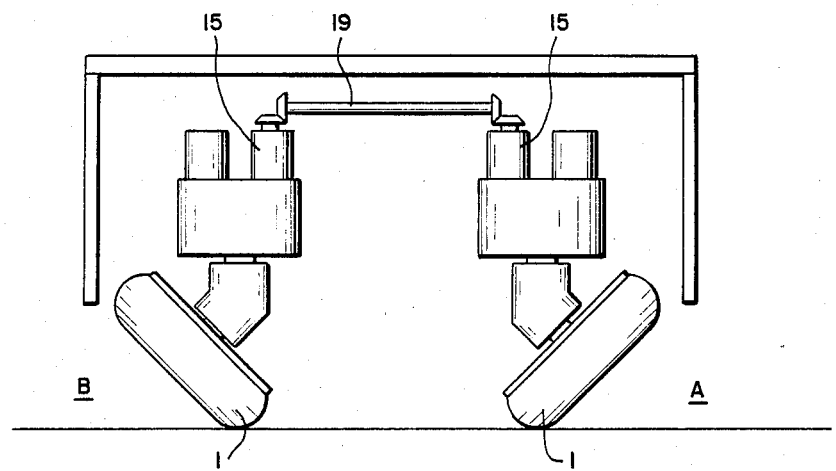
FIG. 15 shows a layout of a drive unit of the present invention being mechanically synchronized with a tilting motor.
Figure 16:
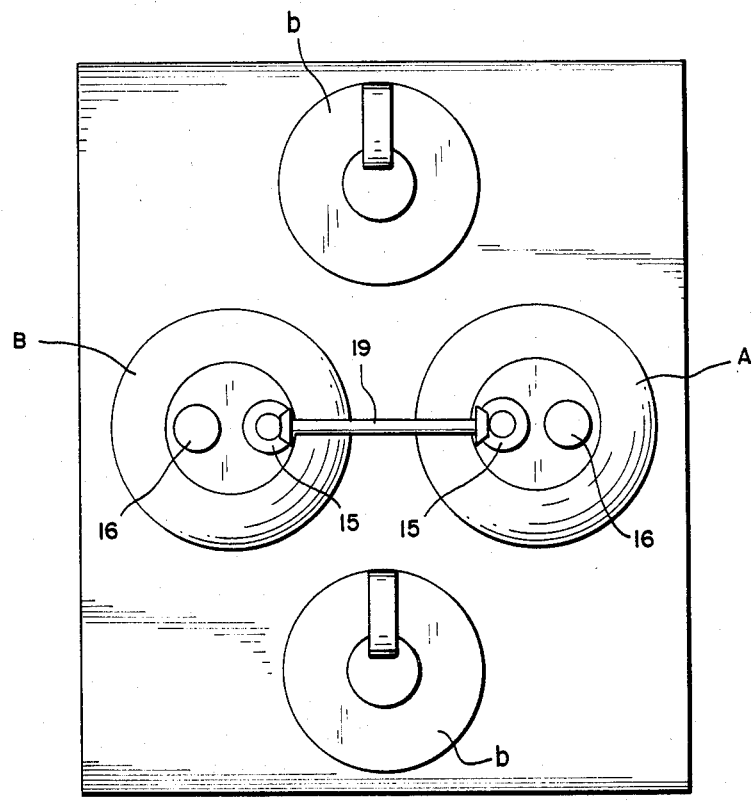
FIG. 16 is a plan view of the drive and follower units of FIG. 15.
Figure 17:
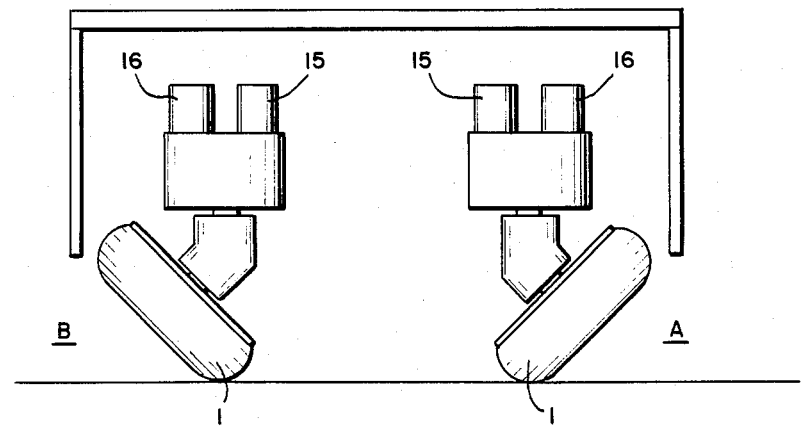
FIGS. 17 and 18 shows, respectively, a layout of a drive unit electrically synchronized with a tilting motor.
Figure 18:
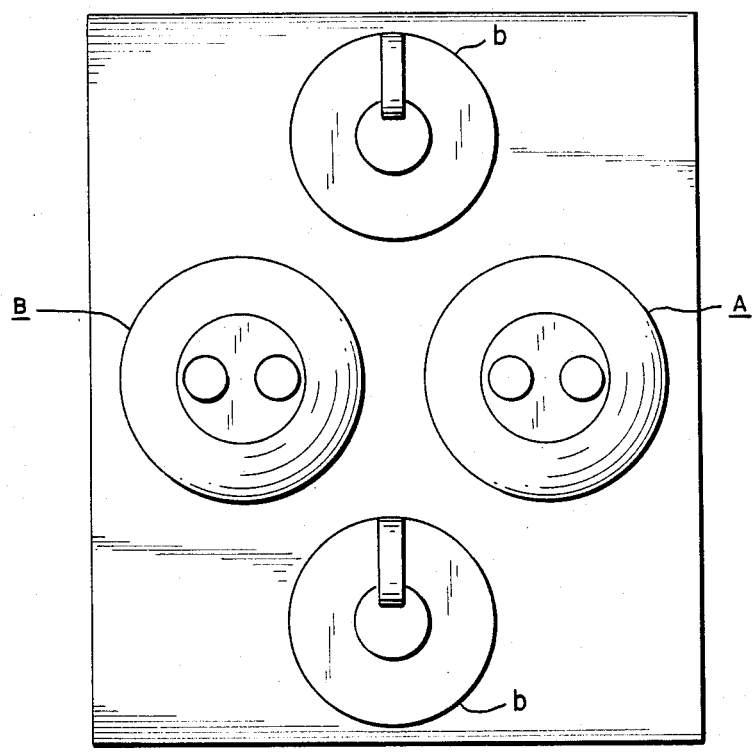
Figure 21:
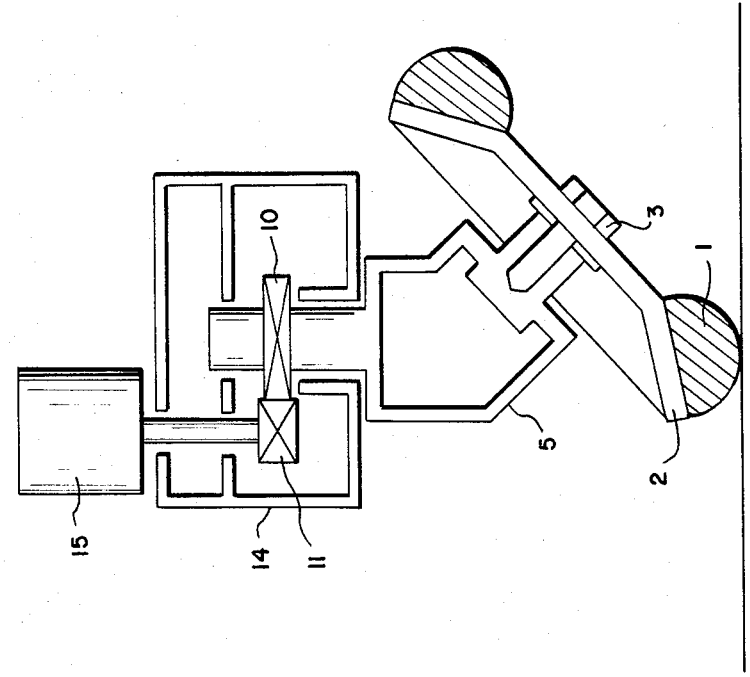
FIG. 21 illustrates one type of follower unit.
Figure 20:
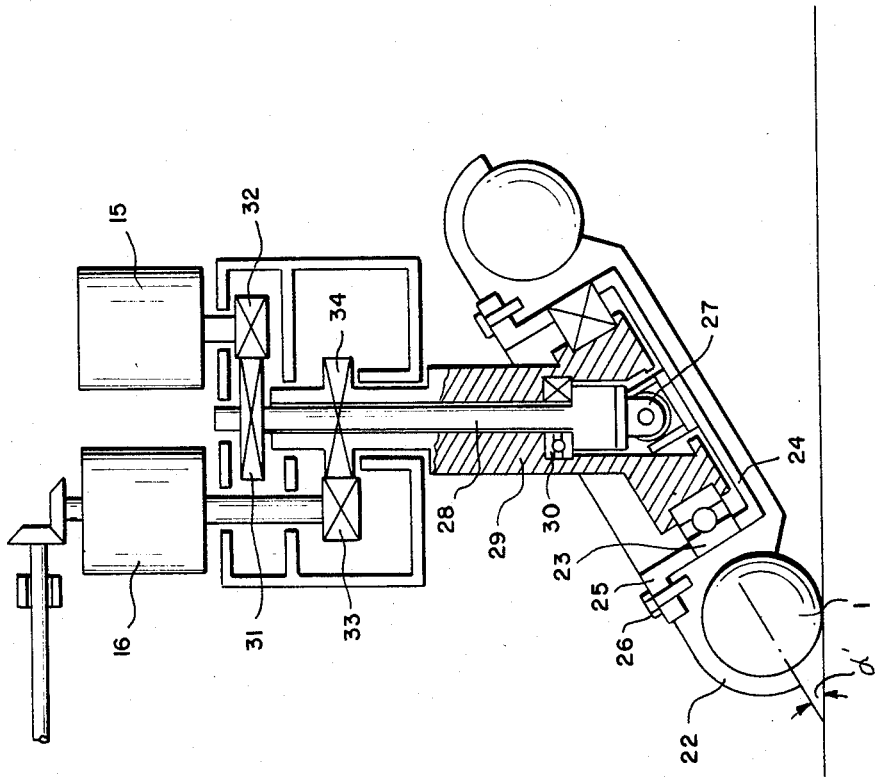
FIG. 20. is a second embodiment of a drive unit in accordance with the teachings of the present invention.

The layout of the drive unit provided on the handling cart of FIGS. 13 and 14 is illustrated in FIGS. 15 and 16. The desired features of the drive unit shown is that it is arranged as a single unit driving and changing the orientation of the tilt with respect to the body function. As a result, the drive unit may be easily provided in a body of a handling cart. Therefore, the layout for the drive unit and follower unit can be arranged in several manners. In this embodiment, as a synchronizing means for changing the orientation of the tilt with respect to the body of the wheel of the drive units A and B two systems are employed. One is a mechanically synchronizing system shown in FIGS. 15 and 16 and the other is an electrically synchronizing system shown in FIGS. 17 and 18. Also, specifically shown in FIG. 19 is the structure of a drive unit. In addition, shown in FIG. 20 is another type of drive unit wherein a universal joint is employed to transfer the motive power from a travelling motor to a wheel. In the embodiment of FIG. 20 is also employed a castor as a follower unit. For a particular purpose and as is shown in FIG. 21, the follower may be a drive unit which is not provided with a driving means. In other words, the follower unit is an undriven drive unit.

In the following is an explanation of the drive unit shown in FIG. 19.

The drive unit of the drive system of the present invention is indicated by the reference label A and includes an annular or doughnut-shaped wheel 1 having a partially spherical surface. The wheel 1 may be of rubber or other elastic material and is arranged to be set at an angle α with respect to a surface on which the drive system runs.

The wheel 1 is fitted to a wheel plate 2 which is provided on a drive shaft 4 by a screw 3. To the drive shaft 4 is mounted a bevel gear 6 which is engaged with a bevel gear 7. The bevel gear 7 is further engaged with a bevel gear 8. Provided on the bevel gear 8 is a vertical shaft 9 to which a spur gear 12 is secured. The spur gear 12 is arranged so as to be engaged with a small spur gear 13 which is provided on a drive shaft of the drive motor 16. As a result of the gear train, the rotation of the drive motor 16 is transferred to the bevel gear 6 through the spur gears 13, 12 and shaft 9 and further through the bevel gears 7 and 8. Therefore, the wheel 1 and wheel plate 2 rotate with the rotation of the bevel gear on the drive shaft 4.

The following is an explanation of the tilting structure of FIG. 19.

A casing 5 holding the drive shaft 4 has therein bevel gears 6, 7 and 8, supports the vertical shaft 9 and is fitted to a a gear box 14. The top portion of the casing 5 is designed in somewhat a double shaft form so that the vertical shaft 9 may rotate in the inner part thereof. Provided on the outside of the double shaft portion is a spur gear 10. The spur gear 10 engages with a small spur gear 11 which is provided on a shaft of a tilting motor 15. Furthermore, a shaft projecting upward from the tilting motor 15 is provided with a bevel gear 18 engaging with a bevel gear 17. The bevel gear 18 is connected through an axle 19 with a shaft of a tilting motor which is provided in a drive unit on the other side B. The rotational speed of the shafts of both tilting motors in the drive units A and B are synchronized. Due to the above tilting structure, when the tilting motor 15 rotates, the spur gears 11 and 10 and the casing 5 are rotated. Therefore, the orientation of the tilt with the body of the wheel plate 2 can be, corresponding to the rotation of the casing 5, changed omnidirectionally. The follower unit shown in FIG. 21 is designed in the same manner as the above described tilting structure except that it is not provided with a drive motor.

The drive unit shown in FIG. 20 is now described in the following paragraphs.

The drive unit of FIG. 20 is also within the scope of the present invention and the doughnut-shaped wheel therein is made of the same material as that of FIG. 19. The wheel 1 is provided on a circular support 22. Within the support 22 is fixed a ball bearing 23 by a ring plate 24 and flange type attachment plate 25 which is secured to the support 22 by a bolt 26. The ring plate 24 and the vertical shaft 28 are connected with each other by a universal joint 27. At the base of the double shaft 29 is obliquely, at an angle α', provided wih a ball bearing 23 and the shaft 29 supports a vertical shaft 28 through a ball bearing 30. Except for the above described construction, the structure of FIG. 20 is identical to the previously described structure of FIG. 19.

In the above arrangement of FIG. 20, when a drive motor 15 rotates, the spur gears 32 and 31 and the vertical shaft 28 are rotated. In addition, the wheel 1 connected to the universal joint 27 is rotated. On the other hand, when the tilting motor 16 rotates, the spur gears 33 and 34 and double shaft 29 are rotated; therefore, the wheel 1 can be tilted omnidirectionally around the drive unit irrespective of the rotation of the drive motor 15.

It should be apparent that with the arrangement of the present invention described above, the doughnut-shaped wheel which is inclined with respect to the support frame provides a partially spherical surface and is tiltable relative to the support frame for moving the drive unit in any desired direction. Accordingly, a land vehicle that incorporates such a drive unit can be manually controlled for movement in any desired direction. In addition, the drive unit is simple in construction and directable in any direction through 360 degrees and can be utilized in a wide variety of applications such as industrial vehicles and wheelchairs.

While preferred embodiments of the present invention have been illustrated and described in detail, it should be apparent that that many modifications and variations may be effected without departing from the spirit and scope of the novel concepts of the present invention.

What is claimed is:

1. An omnidirectional drive system comprising a driven body, a drive unit mounted on said driven body obliquely with respect thereto, and a follower unit mounted on said driven body, said drive unit including a doughnut-shaped wheel which provides a substantially spherical surface, said drive unit having a tilt whose orientation relative to said driven body is changeable by a driving means for changing the direction of movement thereof.

2. An omnidirectional drive system according to claim 1, wherein said driving means for changing the orientation of the tilt with respect to the driven body comprises an electric motor.

3. An omnidirectional drive system according to claim 1, wherein said follower unit is arranged to follow the movement of said drive unit and said driven body is supported only by said follower unit.

4. An omnidirectional drive system according to claim 1, wherein said driven body is supported jointly by said drive unit and said follower unit.

* * * * *